United States Patent
Ohta et al.

(10) Patent No.: US 12,395,280 B2
(45) Date of Patent: Aug. 19, 2025

(54) BASE STATION DEVICE, TERMINAL DEVICE, AND COMMUNICATION METHOD

(71) Applicant: FUJITSU LIMITED, Kawasaki (JP)

(72) Inventors: Yoshiaki Ohta, Yokohama (JP); Yoshihiro Kawasaki, Kawasaki (JP); Takayoshi Ode, Yokohama (JP); Michiharu Nakamura, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/088,524

(22) Filed: Nov. 3, 2020

(65) Prior Publication Data

US 2021/0058200 A1    Feb. 25, 2021

Related U.S. Application Data

(63) Continuation of application No. PCT/JP2018/018615, filed on May 14, 2018.

(51) Int. Cl.

| | |
|---|---|
| *H04L 1/1829* | (2023.01) |
| *H04L 1/1607* | (2023.01) |
| *H04W 28/02* | (2009.01) |
| *H04W 72/23* | (2023.01) |
| *H04W 72/51* | (2023.01) |

(52) U.S. Cl.
CPC .......... *H04L 1/1835* (2013.01); *H04L 1/1635* (2013.01); *H04W 28/0273* (2013.01); *H04W 72/23* (2023.01); *H04W 72/51* (2023.01)

(58) Field of Classification Search
None
See application file for complete search history.

(56) References Cited

U.S. PATENT DOCUMENTS

| | | | | |
|---|---|---|---|---|
| 6,741,555 | B1 * | 5/2004 | Li | H04L 69/16 370/249 |
| 7,047,312 | B1 * | 5/2006 | Aweya | H04L 69/163 370/231 |
| 7,369,498 | B1 * | 5/2008 | Ma | H04L 69/16 370/235 |
| 8,184,561 | B2 * | 5/2012 | Maheshwari | H04L 1/1887 370/310 |
| 10,104,578 | B2 * | 10/2018 | Huang | H04L 47/27 |

(Continued)

OTHER PUBLICATIONS

Ohta et al., "TCP throughput improvement considering wireless access scheme in LTE-advanced uplink: examination of TCP ACK transmission methods", The Institute of Electronics, Information and Communication Engineers (IEICE) Technical Report RCS2016-105 (Jul. 2016), pp. 65-70, with English abstract.

(Continued)

*Primary Examiner* — Gregory B Sefcheck
(74) *Attorney, Agent, or Firm* — Myers Wolin, LLC

(57) ABSTRACT

A base station device that communicates with a terminal device in a wireless manner, the base station device includes, a controller configured to determine an accumulation number which is a number of reception confirmation packets that are able to be accumulated in the terminal device and correspond to packets received from the base station device, in accordance with an amount of data transmitted by the terminal device, and a transmitter configured to transmit a control signal including the determined accumulation number to the terminal device.

6 Claims, 16 Drawing Sheets

(56) References Cited

U.S. PATENT DOCUMENTS

| | | | |
|---|---|---|---|
| 10,128,987 B2* | 11/2018 | Huitema | H04L 49/9005 |
| 2007/0229214 A1* | 10/2007 | Meirick | H04L 47/36 |
| | | | 340/2.23 |
| 2008/0239948 A1* | 10/2008 | Bai | H04L 47/14 |
| | | | 370/230 |
| 2009/0190604 A1 | 7/2009 | Pullen | |
| 2012/0039174 A1* | 2/2012 | Robin | H04W 28/14 |
| | | | 370/235.1 |
| 2014/0029620 A1* | 1/2014 | Zheng | H04L 69/16 |
| | | | 370/392 |
| 2014/0140209 A1* | 5/2014 | Shihada | H04L 49/9005 |
| | | | 370/230 |
| 2016/0302197 A1 | 10/2016 | Xie | |
| 2017/0105138 A1* | 4/2017 | Huang | H04W 28/04 |
| 2017/0339711 A1* | 11/2017 | Belghoul | H04W 72/1268 |
| 2018/0076934 A1* | 3/2018 | Huitema | H04L 1/1832 |
| 2018/0124216 A1* | 5/2018 | Pope | H04L 49/30 |
| 2019/0037025 A1* | 1/2019 | Li | H04L 67/56 |
| 2020/0404536 A1* | 12/2020 | Han | H04L 47/193 |
| 2021/0021454 A1* | 1/2021 | Horiuchi | H04W 52/346 |

OTHER PUBLICATIONS

Ohta et al.,"Controlling TCP ACK transmission: impact of discard ratio on perfromance in LTE-Advanced Pro", 2017 IEEE Conference on Standards for Communications and Networking (CSCN), IEICE Technical Report RCS2016-94-RCS2016-128, Jul. 13, 2016, pp. 227-232.

3GPP TS 36.133 V15.2.0, "3rd Generation Partnership Project; Technical Specification Group Radio Access Network; Evolved Universal Terrestrial Radio Access (E-UTRA); Requirements for support of radio resource management (Release 15)", Mar. 2018.

3GPP TS 36.211 V15.1.0,"3rd Generation Partnership Project; Technical Specification Group Radio Access Network; Evolved Universal Terrestrial Radio Access (E-UTRA); Physical channels and modulation (Release 15)", Mar. 2018.

3GPP TS 36.212 V15.1.0, "3rd Generation Partnership Project; Technical Specification Group Radio Access Network; Evolved Universal Terrestrial Radio Access (E-UTRA); Multiplexing and channel coding (Release 15)", Mar. 2018.

3GPP TS 36.213 V15.1.0, "3rd Generation Partnership Project; Technical Specification Group Radio Access Network; Evolved Universal Terrestrial Radio Access (E-UTRA); Physical layer procedures (Release 15)", Mar. 2018.

3GPP TS 36.214 V15.1.0, "3rd Generation Partnership Project;Technical Specification Group Radio Access Network; Evolved Universal Terrestrial Radio Access (E-UTRA);Physical layer;Measurements(Release 15)", Mar. 2018.

3GPP TS 36.300 V15.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", Mar. 2018.

3GPP TS 36.321 V15.1.0, "3rd Generation Partnership Project; Technical Specification Group Radio Access Network; Evolved Universal Terrestrial Radio Access (E-UTRA); Medium Access Control (MAC) protocol specification (Release 15)", Mar. 2018.

3GPP TS 36.322 V15.0.1, "3rd Generation Partnership Project; Technical Specification Group Radio Access Network; Evolved Universal Terrestrial Radio Access (E-UTRA); Radio Link Control (RLC) protocol specification (Release 15)", Apr. 2018.

3GPP TS 36.323 V14.5.0, "3rd Generation Partnership Project; Technical Specification Group Radio Access Network; Evolved Universal Terrestrial Radio Access (E-UTRA); Packet Data Convergence Protocol (PDCP) specification (Release 14)", Dec. 2017.

3GPP TS 36.331 V15.1.0, "3rd Generation Partnership Project; Technical Specification Group Radio Access Network; Evolved Universal Terrestrial Radio Access (E-UTRA); Radio Resource Control (RRC); Protocol specification (Release 15)", Mar. 2018.

3GPP TS 36.413 V15.1.0, "3rd Generation Partnership Project; Technical Specification Group Radio Access Network; Evolved Universal Terrestrial Radio Access Network (E-UTRAN); S1 Application Protocol (S1AP) (Release 15)", Mar. 2018.

3GPP TS 36.423 V15.1.0, "3rd Generation Partnership Project; Technical Specification Group Radio Access Network; Evolved Universal Terrestrial Radio Access Network (E-UTRAN); X2 application protocol (X2AP) (Release 15)", Mar. 2018.

3GPP TS 36.425 V14.1.0, "3rd Generation Partnership Project; Technical Specification Group Radio Access Network; Evolved Universal Terrestrial Radio Access Network (E-UTRAN); X2 interface user plane protocol (Release 14)", Mar. 2018.

3GPP TR 36.912 V14.0.0, "3rd Generation Partnership Project; Technical Specification Group Radio Access Network; Feasibility study for Further Advancements for E-UTRA (LTE-Advanced) (Release 14)", Mar. 2017.

3GPP TS 37.340 V15.1.0, "3rd Generation Partnership Project; Technical Specification Group Radio Access Network; Evolved Universal Terrestrial Radio Access (E-UTRA) and NR; Multi-connectivity; Stage 2 (Release 15)", Mar. 2018.

Huawei (Rapporteur), "3GPP TS 37.324 specification v1.5.0", Agenda Item: 10.3.4.1, 3GPP TSG-RAN WG2 Meeting #101bis, R2-1806234, Sanya, China, Apr. 16-20, 2018.

3GPP TS 38.201 V15.0.0, "3rd Generation Partnership Project; Technical Specification Group Radio Access Network; NR; Physical layer; General description (Release 15)", Dec. 2017.

3GPP TS 38.202 V15.1.0, "3rd Generation Partnership Project; Technical Specification Group Radio Access Network; NR; Services provided by the physical layer (Release 15)", Mar. 2018.

3GPP TS 38.211 V15.1.0, "3rd Generation Partnership Project; Technical Specification Group Radio Access Network; NR; Physical channels and modulation (Release 15)", Mar. 2018.

3GPP TS 38.212 V15.1.1, "3rd Generation Partnership Project; Technical Specification Group Radio Access Network; NR; Multiplexing and channel coding (Release 15)", Apr. 2018.

3GPP TS 38.213 V15.1.0, "3rd Generation Partnership Project; Technical Specification Group Radio Access Network; NR; Physical layer procedures for control (Release 15)", Mar. 2018.

3GPP TS 38.214 V15.1.0, "3rd Generation Partnership Project; Technical Specification Group Radio Access Network; NR; Physical layer procedures for data (Release 15)", Mar. 2018.

3GPP TS 38.215 V15.1.0, "3rd Generation Partnership Project; Technical Specification Group Radio Access Network; NR; Physical layer measurements (Release 15)", Mar. 2018.

3GPP TS 38.300 V15.1.0, "3rd Generation Partnership Project; Technical Specification Group Radio Access Network; NR; NR and NG-RAN Overall Description; Stage 2 (Release 15)", Mar. 2018.

3GPP TS 38.321 V15.1.0, "3rd Generation Partnership Project; Technical Specification Group Radio Access Network; NR; Medium Access Control (MAC) protocol specification (Release 15)", Mar. 2018.

3GPP TS 38.322 V15.1.0, "3rd Generation Partnership Project; Technical Specification Group Radio Access Network; NR; Radio Link Control (RLC) protocol specification (Release 15)", Mar. 2018.

3GPP TS 38.323 V15.1.0, "3rd Generation Partnership Project; Technical Specification Group Radio Access Network; NR; Packet Data Convergence Protocol (PDCP) specification (Release 15)", Mar. 2018.

3GPP TS 38.331 V15.1.0, "3rd Generation Partnership Project; Technical Specification Group Radio Access Network; NR; Radio Resource Control (RRC) protocol specification (Release 15)", Mar. 2018.

3GPP TS 38.401 V15.1.0, "3rd Generation Partnership Project; Technical Specification Group Radio Access Network; NG-RAN; Architecture description (Release 15)", Mar. 2018.

Nokia (rapporteur), "TS 38.410 v0.9.0 covering agreements of RAN3#99bis", Agenda Item: 11.4, 3GPP TSG-RAN WG3#99bis, R3-182523, Sanya, China, Apr. 16-20, 2018.

Nokia (rapporteur), "TS 38.413 v0.8.0 covering agreements of RAN3#99bis", Agenda item:10, 3GPP TSG-RAN WG3 Meeting #99bis, R3-18xxxx, Sanya, China, Apr. 16-20, 2018.

(56) References Cited

OTHER PUBLICATIONS

Qualcomm Incorporated, "TS 38.420 draft v0.8.0 based on agreements from RAN3#99bis", Agenda item: 10.11, 3GPP TSG-RAN WG3 #99bis, R3-182526, Sanya, China, Apr. 16-20, 2018.
Ericsson, "TS 38.423 version 0.8.0", Agenda Item:10.11, 3GPP TSG-RAN WG3 Meeting #99bis, R3-182527, Sanya, China, Apr. 16-20, 2018.
3GPP TS 38.470 V15.1.0, "3rd Generation Partnership Project; Technical Specification Group Radio Access Network; NG-RAN; F1 general aspects and principles (Release 15)", Mar. 2018.
3GPP TS 38.473 V15.1.1, "3rd Generation Partnership Project; Technical Specification Group Radio Access Network; NG-RAN; F1 application protocol (F1AP) (Release 15)", Apr. 2018.
3GPP TR 38.801 V14.0.0, "3rd Generation Partnership Project; Technical Specification Group Radio Access Network; Study on new radio access technology: Radio access architecture and interfaces (Release 14)", Mar. 2017.
3GPP TR 38.802 V14.2.0, "3rd Generation Partnership Project; Technical Specification Group Radio Access Network; Study on New Radio Access Technology Physical Layer Aspects (Release 14)", Sep. 2017.
3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.
3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.
3GPP TR 38.900 V14.3.1, "3rd Generation Partnership Project; Technical Specification Group Radio Access Network; Study on channel model for frequency spectrum above 6 GHZ (Release 14)", Jul. 2017.
3GPP TR 38.912 V14.1.0, "3rd Generation Partnership Project; Technical Specification Group Radio Access Network; Study on New Radio (NR) access technology (Release 14)", Jun. 2017.
3GPP TR 38.913 V14.3.0, "3rd Generation Partnership Project; Technical Specification Group Radio Access Network; Study on Scenarios and Requirements for Next Generation Access Technologies; (Release 14)", Jun. 2017.
International Search Report issued by the Japan Patent Office for corresponding International Patent Application No. PCT/JP2018/018615, mailed on Jul. 24, 2018, with an English translation.
Written Opinion of the International Searching Authority issued for corresponding International Patent Application No. PCT/JP2018/018615 mailed on Jul. 24, 2018, with an English translation.
Notice of Reasons for Refusal issued by the Japan Patent Office for corresponding Japanese Patent Application No. 2020-518839, dated Nov. 9, 2021, with a full machine translation.
Notice of Reasons for Refusal issued by the Japan Patent Office for corresponding Japanese Patent Application No. 2020-518839, mailed on Jun. 7, 2022, with an English translation.
First Notification of Office Action issued by the China National Intellectual Property Administration for corresponding Chinese Patent Application No. 201880093402.7, dated Jan. 19, 2023, with an English translation.
Second Notification of Office Action issued by the China National Intellectual Property Administration for corresponding Chinese Patent Application No. 201880093402.7, dated Sep. 16, 2023, with an English translation.

* cited by examiner

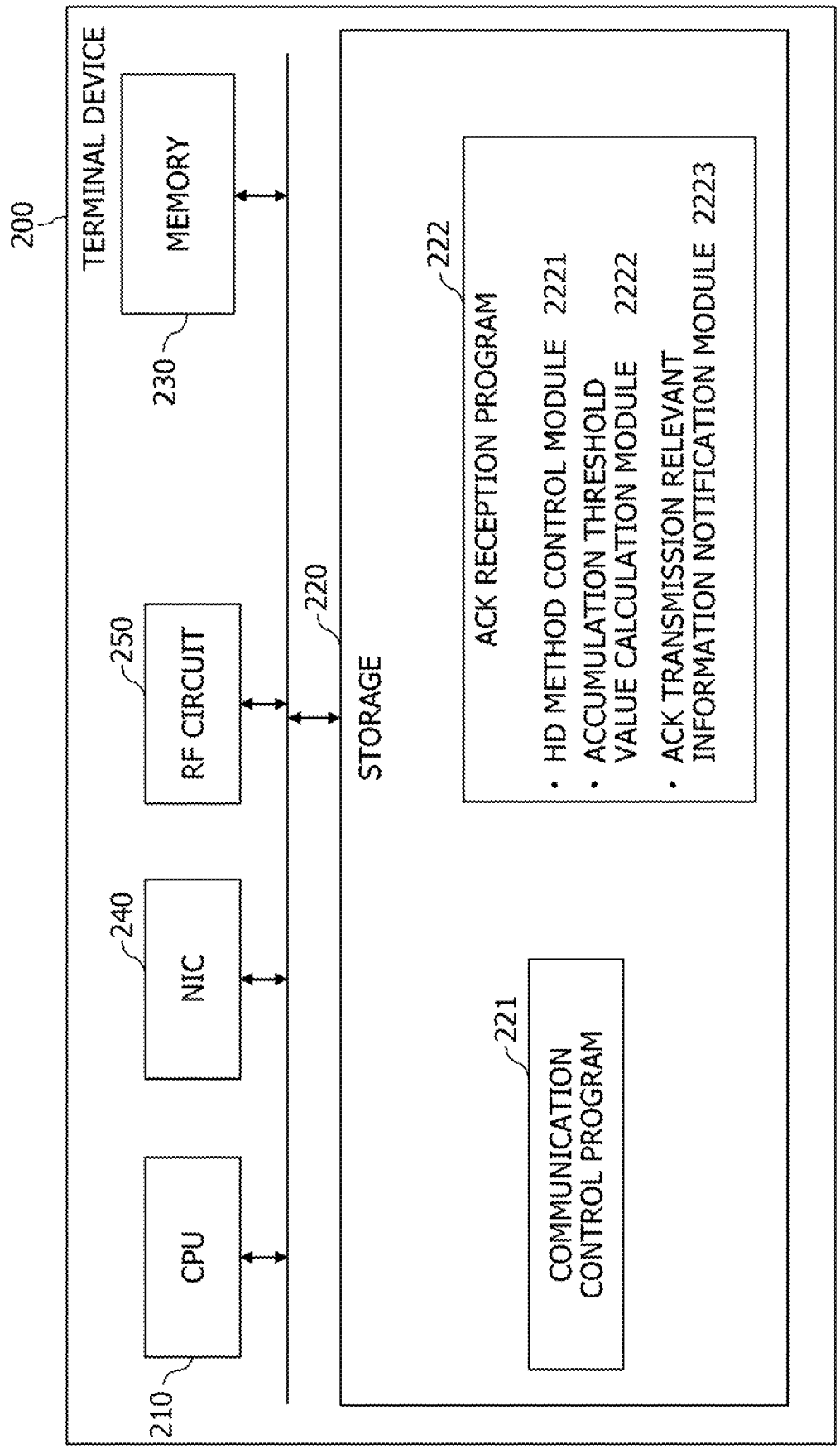

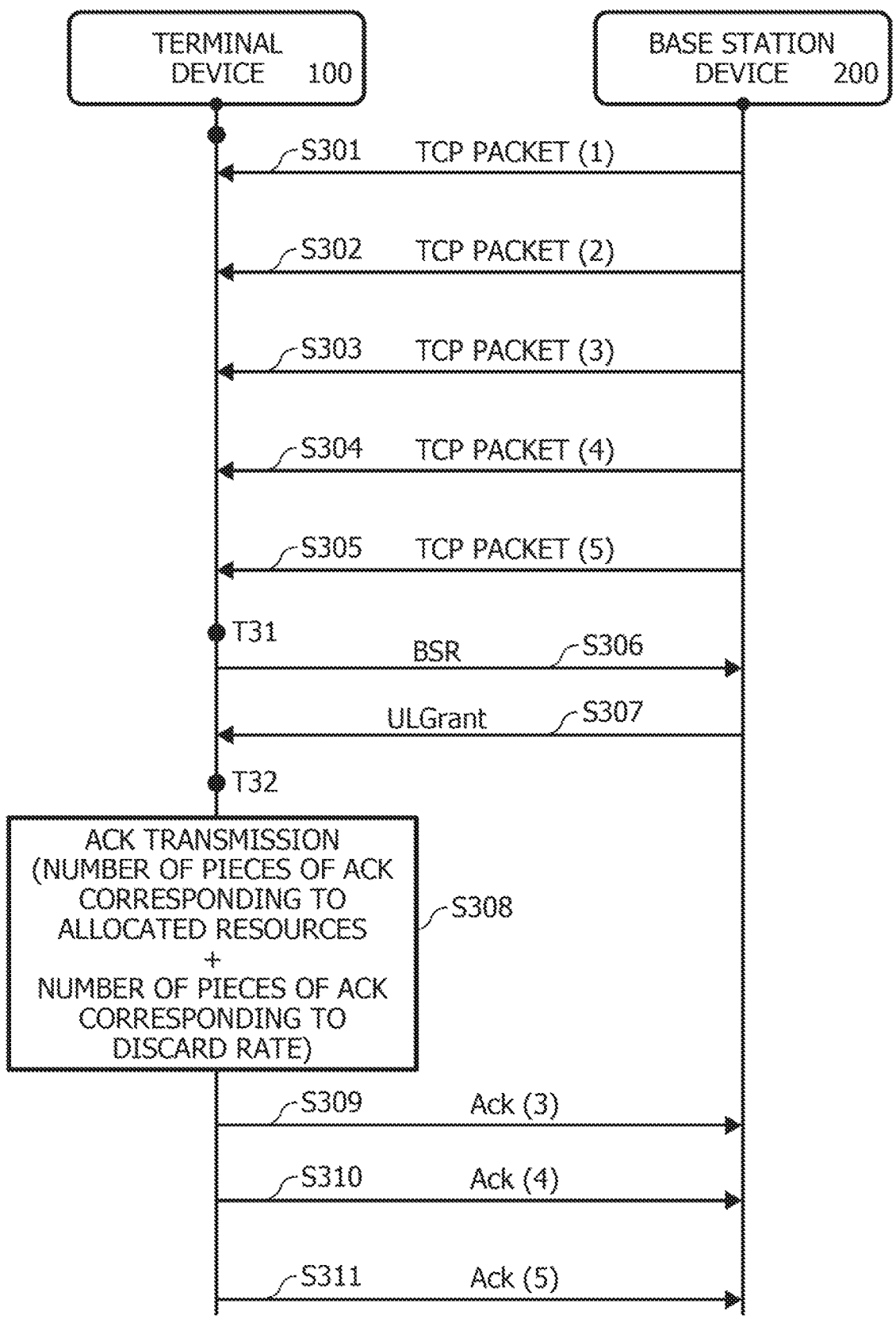

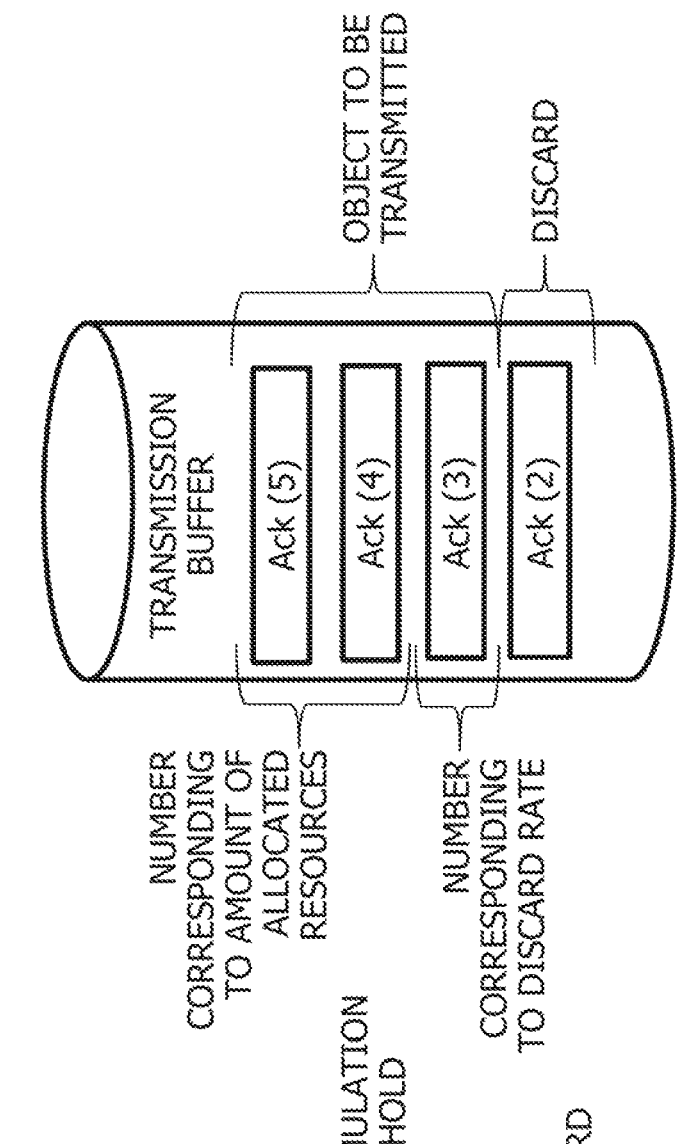
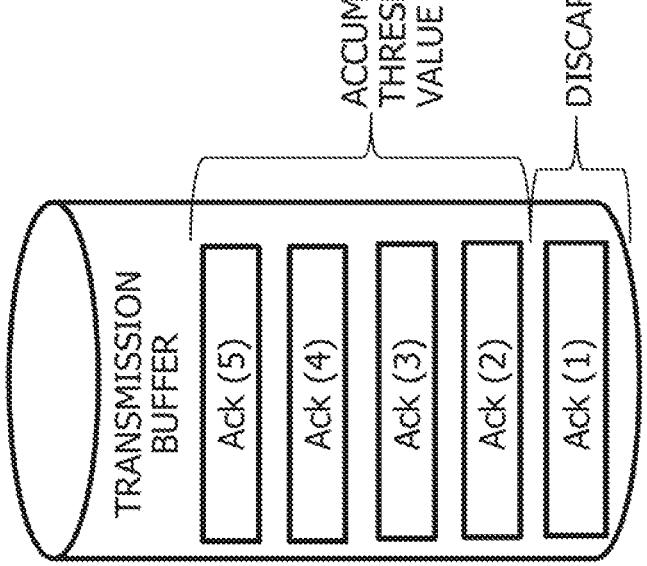

FIG. 9

| UE | Nack | T |
|---|---|---|
| UE8 | 2.288745 | 2 |
| UE5 | 1.826568 | 1 |
| UE4 | 5.406827 | 5 |
| UE2 | 4.523985 | 4 |
| UE10 | 4.231550 | 4 |
| UE6 | 3.788745 | 3 |
| UE1 | 5.052583 | 5 |
| UE3 | 5.883764 | 5 |
| UE7 | 6.348708 | 6 |
| UE9 | 4.231550 | 4 |

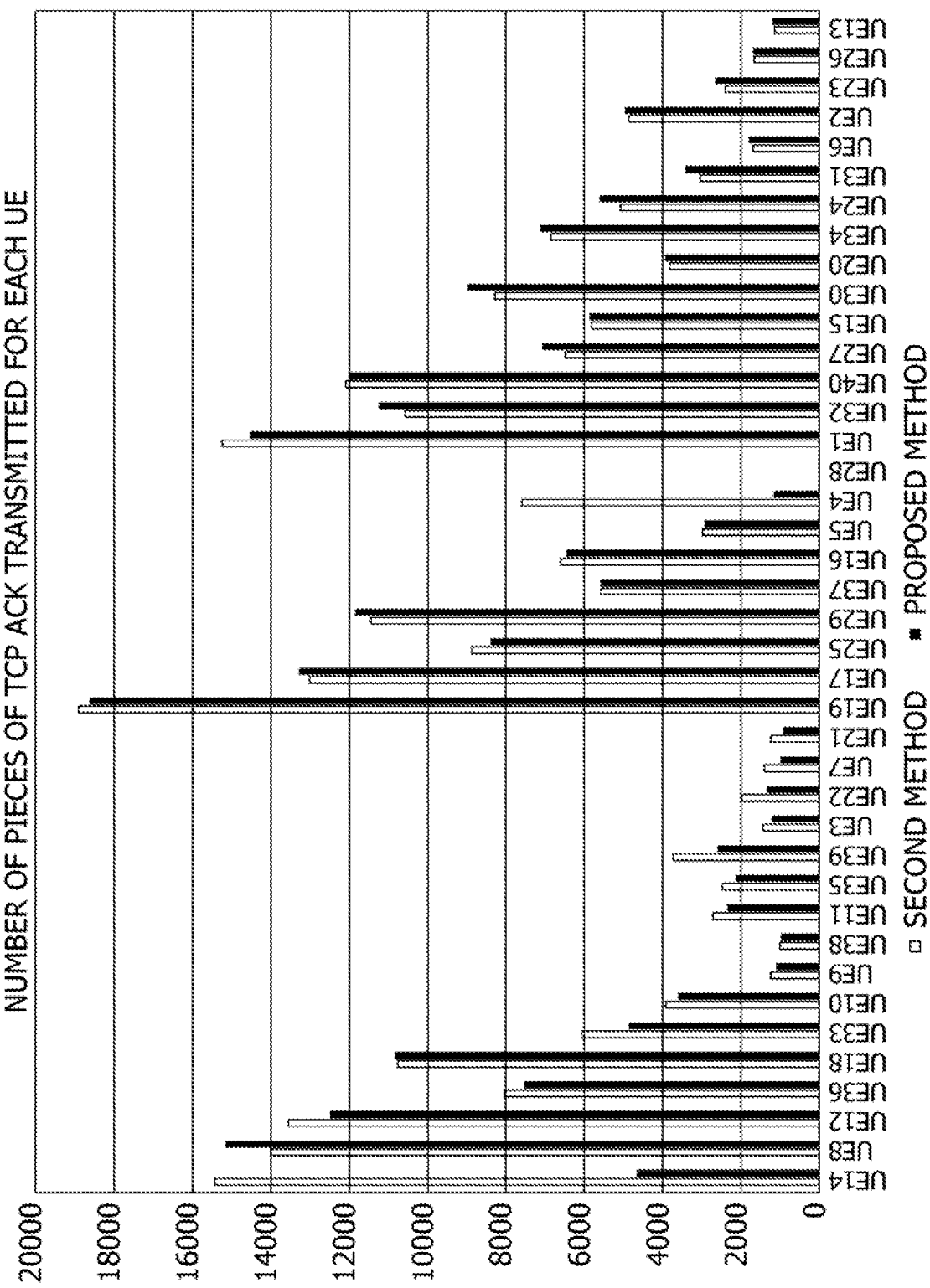

BASE STATION DEVICE, TERMINAL DEVICE, AND COMMUNICATION METHOD

CROSS-REFERENCE TO RELATED APPLICATION

This application is a continuation application of International Application Number PCT/JP2018/018615 filed on May 14, 2018 and designated the U.S., the entire contents of which are incorporated herein by reference.

FIELD

The present disclosure relates to a base station device, a terminal device, and a communication method.

BACKGROUND

In current networks, traffic of mobile terminals (smartphones and future phones) accounts for the majority of network resources. In addition, traffic used by mobile terminals tends to continue to expand.

A fifth generation mobile communication (5G or new radio (NR)) communication standard demands a technique for realizing an increase in a data rate, an increase in capacity, and a reduction in delay, in addition to a fourth generation mobile communication (4G) standard technique. Meanwhile, regarding a fifth generation communication standard, technical studies are being conducted in working groups of 3GPP (for example, TSG-RAN WG1, TSG-RAN WG2, and the like).

In data communication, a communication protocol called a transmission control protocol/internet protocol (TCP/IP) may be used. TCP/IP is a protocol in which TCP and IP are combined with each other and is used as a standard on the Internet and the like.

Regarding communication in TCP, when a transmission-side communication device transmits a data packet and a reception-side communication device can receive a data packet correctly, an acknowledgement (ACK), which is a confirmation response with respect to the received data packet, is returned. The transmission-side communication device receives an ACK and transmits the next data packet. In this manner, in the communication in TCP, it is possible to confirm that a data packet has arrived by receiving an ACK, whereby reliable communication is realized.

In TCP communication, when the number of ACKs transmitted increases, communication resources may be used in the transmission of ACKs, and a communication speed may be reduced. Consequently, examples of a method of reducing the number of ACKs to be transmitted include a method of discarding the number of ACKs exceeding allocated resources. In addition, examples of a method of reducing the number of ACKs to be transmitted include a method of permitting up to a predetermined number of ACKs to stay in a transmission buffer and discarding ACKs exceeding the predetermined number.

Techniques related to LTE and TCP/IP are disclosed in the following related art.

CITATION LIST

Non-Patent Literature

NON PATENT LITERATURE 1: 3GPP TS 36.133 V15.2.0 (2018-03)
NON PATENT LITERATURE 2: 3GPP TS 36.211 V15.1.0 (2018-03)
NON PATENT LITERATURE 3: 3GPP TS 36.212 V15.1.0 (2018-03)
NON PATENT LITERATURE 4: 3GPP TS 36.213 V15.1.0 (2018-03)
NON PATENT LITERATURE 5: 3GPP TS 36.214 V15.1.0 (2018-03)
NON PATENT LITERATURE 6: 3GPP TS 36.300 V15.1.0 (2018-03)
NON PATENT LITERATURE 7: 3GPP TS 36.321 V15.1.0 (2018-03)
NON PATENT LITERATURE 8: 3GPP TS 36.322 V15.0.1 (2018-04)
NON PATENT LITERATURE 9: 3GPP TS 36.323 V14.5.0 (2017-12)
NON PATENT LITERATURE 10: 3GPP TS 36.331 V15.1.0 (2018-03)
NON PATENT LITERATURE 11: 3GPP TS 36.413 V15.1.0 (2018-03)
NON PATENT LITERATURE 12: 3GPP TS 36.423 V15.1.0 (2018-03)
NON PATENT LITERATURE 13: 3GPP TS 36.425 V14.1.0 (2018-03)
NON PATENT LITERATURE 14: 3GPP TR 36.912 V14.0.0 (2017-03)
NON PATENT LITERATURE 15: 3GPP TS 37.340 V15.1.0 (2018-03)
NON PATENT LITERATURE 16: 3GPP TS 37.324 V1.5.0 (2018-04)
NON PATENT LITERATURE 17: 3GPP TS 38.201 V15.0.0 (2017-12)
NON PATENT LITERATURE 18: 3GPP TS 38.202 V15.1.0 (2018-03)
NON PATENT LITERATURE 19: 3GPP TS 38.211 V15.1.0 (2018-03)
NON PATENT LITERATURE 20: 3GPP TS 38.212 V15.1.1 (2018-04)
NON PATENT LITERATURE 21: 3GPP TS 38.213 V15.1.0 (2018-03)
NON PATENT LITERATURE 22: 3GPP TS 38.214 V15.1.0 (2018-03)
NON PATENT LITERATURE 23: 3GPP TS 38.215 V15.1.0 (2018-03)
NON PATENT LITERATURE 24: 3GPP TS 38.300 V15.1.0 (2018-03)
NON PATENT LITERATURE 25: 3GPP TS 38.321 V15.1.0 (2018-03)
NON PATENT LITERATURE 26: 3GPP TS 38.322 V15.1.0 (2018-03)
NON PATENT LITERATURE 27: 3GPP TS 38.323 V15.1.0 (2018-03)
NON PATENT LITERATURE 28: 3GPP TS 38.331 V15.1.0 (2018-03)
NON PATENT LITERATURE 29: 3GPP TS 38.401 V15.1.0 (2018-03)
NON PATENT LITERATURE 30: 3GPP TS 38.410 V 0.9.0 (2018-04)
NON PATENT LITERATURE 31: 3GPP TS 38.413 V0.8.0 (2018-04)

NON PATENT LITERATURE 32: 3GPP TS 38.420 V0.8.0 (2018-04)
NON PATENT LITERATURE 33: 3GPP TS 38.423 V0.8.0 (2018-04)
NON PATENT LITERATURE 34: 3GPP TS 38.470 V15.1.0 (2018-03)
NON PATENT LITERATURE 35: 3GPP TS 38.473 V15.1.1 (2018-04)
NON PATENT LITERATURE 36: 3GPP TR 38.801 V14.0.0 (2017-03)
NON PATENT LITERATURE 37: 3GPP TR 38.802 V14.2.0 (2017-09)
NON PATENT LITERATURE 38: 3GPP TR 38.803 V14.2.0 (2017-09)
NON PATENT LITERATURE 39: 3GPP TR 38.804 V14.0.0 (2017-03)
NON PATENT LITERATURE 40: 3GPP TR 38.900 V14.3.1 (2017-07)
NON PATENT LITERATURE 41: 3GPP TR 38.912 V14.1.0 (2017-06)
NON PATENT LITERATURE 42: 3GPP TR 38.913 V14.3.0 (2017-06)

However, a communication device using a method of discarding some ACKs does not return an ACK until a plurality of packets are received. For example, a transmission-side communication device of a packet may perform control of receiving an ACK or not transmitting the next packet when a total amount of data to be transmitted is set to be equal or greater than a predetermined size or until a transmission waiting timer of the packet times out. In a case where the transmission-side communication device performs such control, it is not possible to transmit the next packet until the transmission waiting timer of the packet times out in a case where a total amount of transmission data is not set to be equal to or greater than a predetermined size due to a small amount of data to be transmitted. In this case, the reception of data is delayed in the reception-side communication device which is waiting for the next data packet.

SUMMARY

A base station device that communicates with a terminal device in a wireless manner, the base station device includes, a controller configured to determine an accumulation number which is a number of reception confirmation packets that are able to be accumulated in the terminal device and correspond to packets received from the base station device, in accordance with an amount of data transmitted by the terminal device, and a transmitter configured to transmit a control signal including the determined accumulation number to the terminal device.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 depicts a diagram illustrating a configuration example of the base station device 200.

FIG. 5 depicts a diagram illustrating an example of a sequence of an ACK transmission process using an HD method.

FIG. 6A and FIG. 6B depict diagram illustrating an example of a transmission buffer at each timing.

FIG. 9 depicts a diagram illustrating an example of an accumulation threshold value of each of the terminal devices 100.

FIG. 16 depicts a diagram illustrating an example of the number of ACKs to be transmitted in each of a second method and a proposal method for each terminal device 100.

DESCRIPTION OF EMBODIMENTS

Hereinafter, embodiments of the disclosure will be described in detail with reference to the accompanying drawings. Problems and examples in the specification are examples and do not limit the scope of rights of the application. In particular, when expressions that are described differently are technically equivalent, the technique of the application can be applied in spite of the difference in expression, and the scope of rights is not thus limited.

First Embodiment

First, a first embodiment will be described.

A communication system 10 includes a terminal device and a base station device that communicates with the terminal device in a wireless manner. The base station device includes a control unit that determines the number of reception confirmation packets capable of being accumulated in the terminal device (accumulation threshold value) in accordance with the amount of data transmitted by the terminal device, and the reception confirmation packet corresponds to a packet received from the base station device. In addition, the base station device includes a transmission unit capable of transmitting a control signal including the determined accumulation number to the terminal device.

Figure 1:
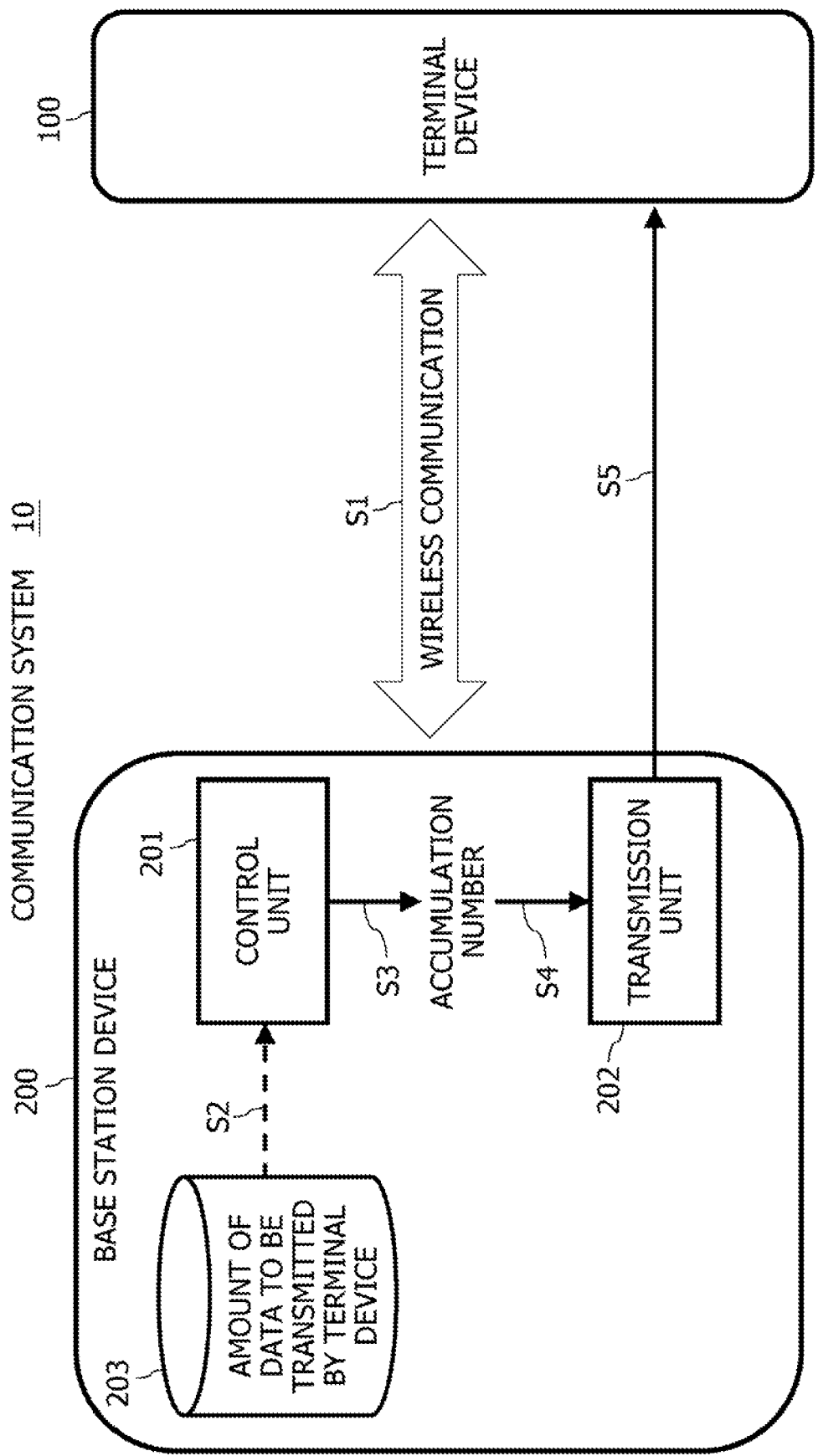
FIG. 1 depicts a diagram illustrating a configuration example of the communication system 10 in the first embodiment.

FIG. 1 depicts a diagram illustrating a configuration example of the communication system 10 in the first embodiment. The communication system 10 includes a terminal device 100 and a base station device 200. The terminal device 100 and the base station device 200 communicate with each other in a wireless manner (S1), and transmit and receive data to and from each other using, for example, a packet. The terminal device 100 is a mobile communication terminal such as a mobile phone. In addition, the base station device 200 is, for example, gNodeB in 5G.

The terminal device 100 and the base station device 200 communicate with each other on the basis of, for example, TCP/IP. For example, the base station device 200, upon receiving data of which the terminal device 100 is a transmission destination from a network not illustrated in the drawing, transmits a TCP packet including the data to the terminal device 100. When the terminal device 100 receives the TCP packet, the terminal device transmits a reception confirmation packet (for example, ACK) corresponding to the received TCP packet (for notifying a transmission source device of the reception of the TCP packet). Hereinafter, a TCP packet, a reception confirmation packet, or both will be simply referred to as a packet.

The base station device 200 including a processor, a storage, and a memory, which are not illustrated in the drawing, constructs a control unit 201 and a transmission unit 202 and executes processes by loading programs stored in the storage to the memory and causing the processor to execute the loaded programs.

The base station device 200 includes the control unit 201, the transmission unit 202, and data 203. Regarding the data 203, for example, the number of ACKs to be transmitted in a predetermined time by the terminal device 100 (or an average value of the number of ACKs to be transmitted) is stored.

The control unit 201 determines an accumulation number (S3) on the basis of (in accordance with) the amount of data to be transmitted by the terminal device 100 and included in the data 203 (S2). The accumulation number is a maximum number of ACKs capable of being accumulated by the terminal device 100, and ACKs exceeding the accumulation number are discarded by the terminal device 100.

The transmission unit 202 includes the accumulation number determined by the control unit 201 in a control signal (S4) and transmits the control signal to the terminal device 100 (S5).

The terminal device 100 receives the control signal including the accumulation number and acquires the accumulation number. The terminal device 100 accumulates reception confirmations in accordance with the acquired accumulation number and discards reception confirmations exceeding the accumulation number.

In the first embodiment, the base station device 200 determines an accumulation number in accordance with the amount of data transmitted by the terminal device 100. Thereby, the terminal device 100 can suppress the transmission of an excessive number of ACKs.

Meanwhile, an accumulation number (accumulation threshold value) of ACKs capable of being accumulated in the terminal device 100 may be determined in accordance with the amount of downlink data transmitted. The terminal device 100 may transmit the number of ACKs corresponding to the number of TCP packets received. Consequently, the base station device 200 may regard the terminal device 100 as transmitting the number of ACKs corresponding to the amount of downlink data transmitted and may determine an accumulation number in accordance with the amount of downlink data transmitted.

Second Embodiment

Next, a second embodiment will be described.
<Configuration Example of Communication System>

Figure 2:
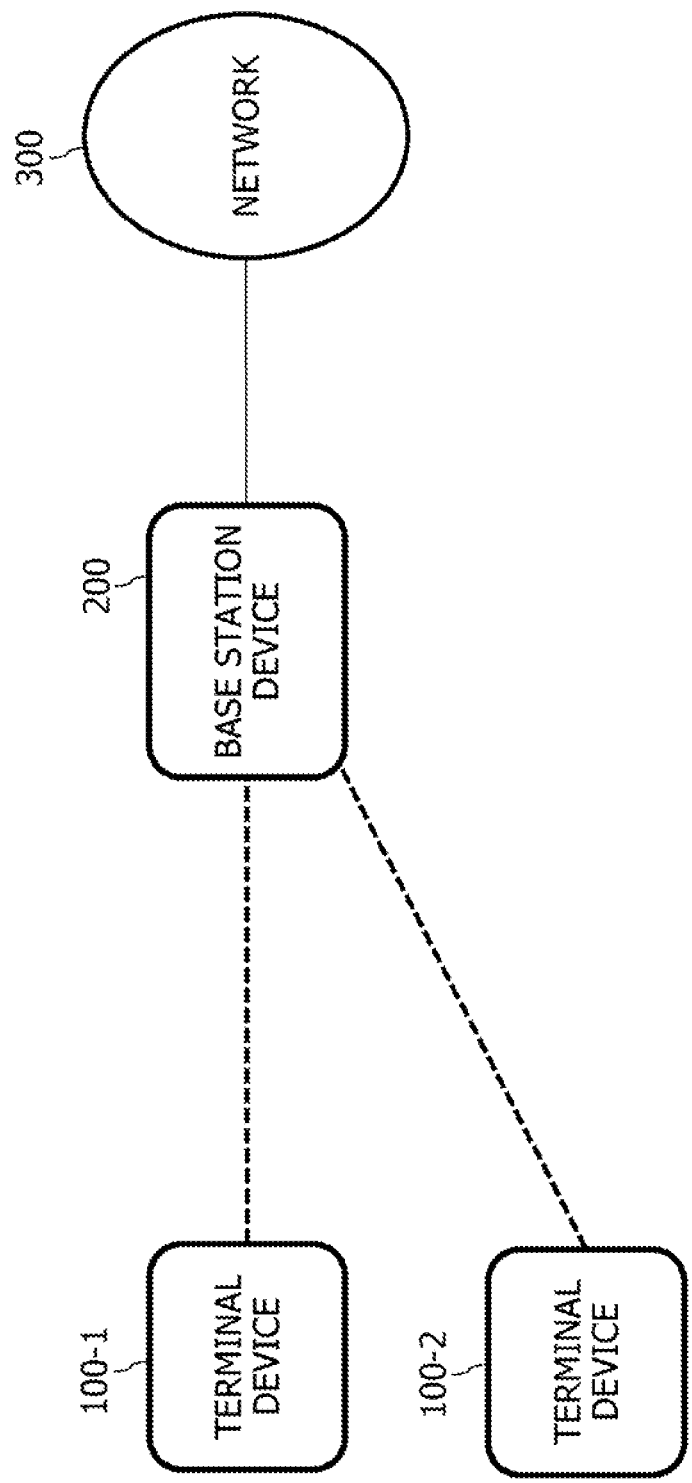
FIG. 2 depicts a diagram illustrating a configuration example of a communication system 10.

FIG. 2 depicts a diagram illustrating a configuration example of a communication system 10. The communication system 10 includes terminal devices 100-1 and 100-2, a base station device 200, and a network 300. The communication system 10 is a communication system corresponding to, for example, a long term evolution (LTE) communication standard or 5G.

The terminal devices 100-1 and 100-2 (which may hereinafter be referred to as a terminal device 100) are a mobile communication terminal (communication device) such as a smartphone or a tablet terminal. For example, the terminal device 100 is connected to the base station device 200 in a wireless manner and communicates with the network 300 through the base station device 200. The terminal device 100 downloads data from the base station device 200 or the network 300 and receives a service to be provided. In addition, the terminal device 100 communicates with the base station device 200 or the network 300 on the basis of, for example, TCP/IP.

The base station device 200 is a communication device that relays packets transmitted and received by the terminal device 100. For example, the base station device 200 is evolved Node B (eNodeB) in LTE or gNodeB in 5G. In addition, the base station device 200 may be network equipment such as a switch or a router.

The network 300 may be, for example, the Internet or may be an intranet constituted by a dedicated line.
<Configuration Example of Terminal Device>

Figure 3:
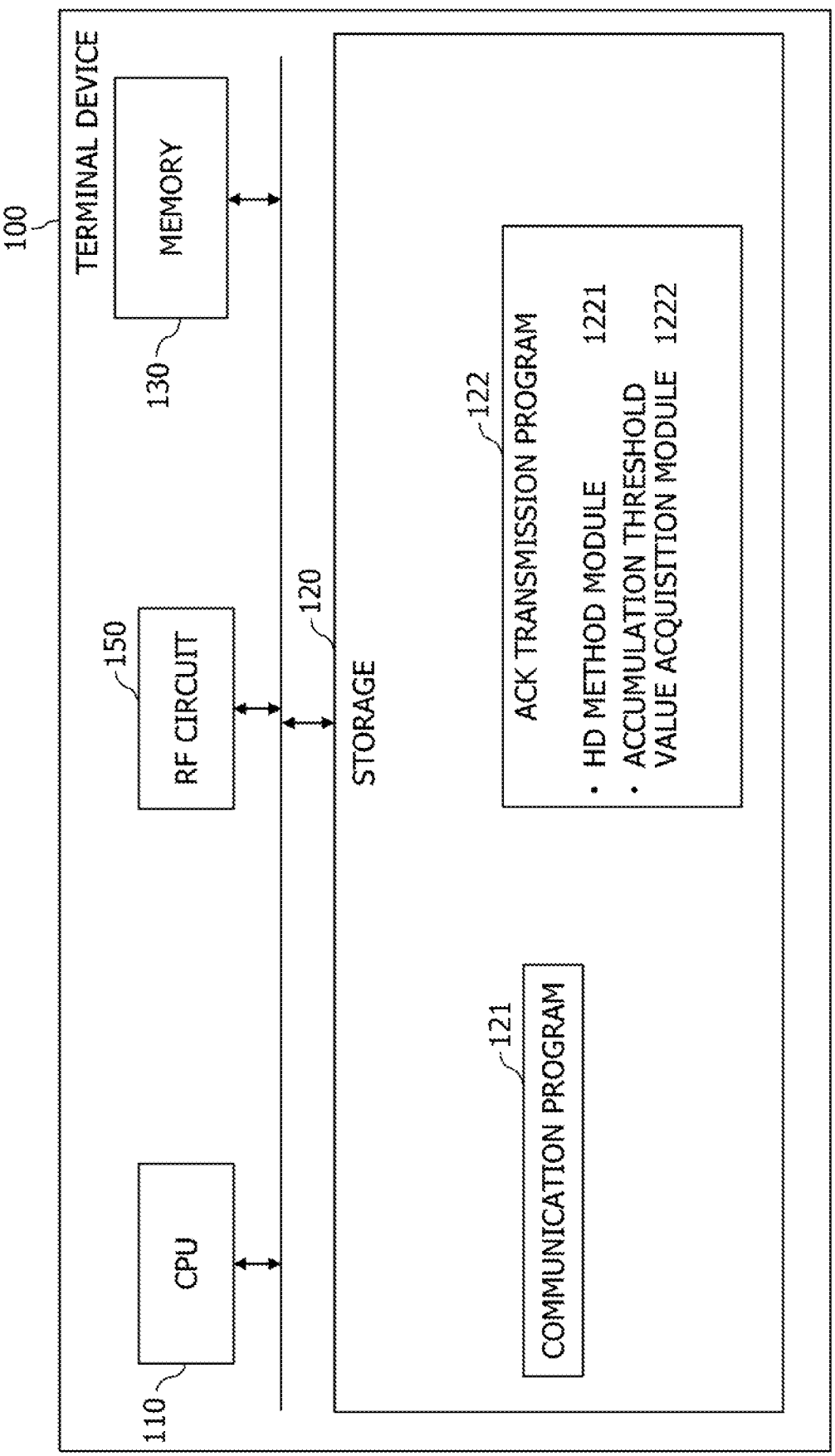
FIG. 3 depicts a diagram illustrating a configuration example of the terminal device 100.

FIG. 3 depicts a diagram illustrating a configuration example of the terminal device 100. The terminal device 100 includes a central processing unit (CPU) 110, a storage 120, a memory 130, and a radio frequency (RF) circuit 150.

The storage 120 is an auxiliary storage device such as a flash memory, a hard disk drive (HDD), or a solid state drive (SSD) which stores programs and data. The storage 120 stores a communication program 121 and an ACK transmission program 122.

The memory 130 is a region in which a program stored in the storage 120 is loaded. In addition, the memory 130 is also used as a region in which a program stores data.

The RF circuit 150 is a device which is connected to the base station device 200 in a wireless manner. The RF circuit 150 includes, for example, an antenna, transmits and receives electric waves (a packet) to and from the base station device 200 through an antenna.

The CPU 110 is a processor that loads the program stored in the storage 120 to the memory 130, executes the loaded program, and realizes each process.

The CPU 110 performs communication processing by executing the communication program 121. The communication processing is processing for performing communication with the base station device 200, the network 300, and the like. The terminal device 100 performs communication processing, for example, when communication is performed by a user of the terminal device 100 or in accordance with a request of a program to be executed in the terminal device 100.

In addition, the CPU 110 executes the ACK transmission program 122 to construct a transmission control unit and perform an ACK transmission process. The ACK transmission process is a process of generating an ACK (response confirmation) corresponding to a TCP packet received from the base station device 200, storing the generated ACK in a transmission buffer, and transmitting the ACK to the base station device 200 in accordance with an ACK transmission method.

The CPU 110 executes a hybrid discard (HD) method module 1221 included in the ACK transmission program 122 to construct a transmission control unit and perform an ACK transmission process by an HD method. The HD method is an ACK transmission method in which both an active discard (AD) method and a passive discard (PD) method are simultaneously executed.

The PD method is an ACK transmission method in which the number of ACKs corresponding to the amount of allocated resources are transmitted, the number of ACKs corresponding to a discard rate among not-transmitted ACKs are discarded, and the other ACKs are transmitted. That is, in the PD method, the sum of the number of ACKs corresponding to the amount of allocated resources and the number of ACKs that are not discarded in accordance with a discard rate is the number of ACKs to be transmitted by the terminal device 100. Meanwhile, the PD method may be an ACK transmission method in which the number of ACKs corresponding to the amount of allocated resources are transmitted, not-transmitted ACK are discarded.

The AD method is an ACK transmission method in which ACKs are accumulated in the transmission buffer up to an accumulation threshold value (a maximum number of ACKs that can be accumulated), and ACKs exceeding the accumulation threshold value are discarded in accordance with a discard rate. That is, in an AD discard rate method, the sum of the number of ACKs corresponding to the accumulation threshold value and the number of ACKs that are not discarded in accordance with a discard rate is the number of ACKs to be transmitted by the terminal device 100. Meanwhile, the AD method may be a transmission method in which ACKs are accumulated in the transmission buffer up to the accumulation threshold value, and ACKs exceeding the accumulation threshold value are discarded.

The HD method is an ACK transmission method in which ACKs are discarded in two steps of an AD method and a PD method. The HD method is an ACK transmission method in which the number of ACKs exceeding the amount of allocated resources among the ACKs within an accumulation threshold value are discarded in accordance with a discard rate. Meanwhile, the HD method may be an ACK transmission method in which the number of ACKs exceeding the amount of allocated resources among the ACKs within an accumulation threshold value are discarded.

The CPU 110 executes an accumulation threshold value acquisition module 1222 included in the ACK transmission program 122 to construct a reception unit and perform an accumulation threshold value acquisition process. The accumulation threshold value acquisition process is a process of acquiring an accumulation threshold value to be used in an HD method from the base station device 200. In the accumulation threshold value acquisition process, a control signal is received, and an accumulation threshold value included in the received control signal is acquired. The control signal is, for example, radio resource control (RRC) signaling.

<Configuration Example of Base Station Device>

FIG. 4 depicts a diagram illustrating a configuration example of the base station device 200. The base station device 200 includes a CPU 210, a storage 220, a memory 230, a network interface card (NIC) 240, and an RF circuit 250.

The storage 220 is an auxiliary storage device, such as a flash memory, an HDD, or an SSD, which stores programs and data. The storage 220 stores a communication control program 221 and an ACK reception program 222.

The memory 230 is a region in which a program stored in the storage 220 is loaded. In addition, the memory 230 is used as a region in which a program stores data.

The NIC 240 is an interface which is connected to the network 300. The base station device 200 communicates with a communication device within the network 300 through the NIC 240.

The RF circuit 250 is a device which is connected to the terminal device 100 in a wireless manner. The RF circuit 250 includes, for example, an antenna and transmits and receives electric waves (a packet) to and from the terminal device 100 through the antenna.

The CPU 210 is a processor that loads the program stored in the storage 220 to the memory 230, executes the loaded program, and realizes each process.

The CPU 210 executes the communication control program 221 to construct an allocation unit and perform a communication control process. The communication control process is a process of controlling communication of the terminal device 100. For example, the communication control process is a process of allocating wireless resources to the terminal device 100.

In addition, the CPU 210 executes the ACK reception program 222 to construct a control unit and perform an ACK reception process. The ACK reception process is a process of receiving an ACK (response confirmation) from the terminal device 100. In addition, the ACK reception process is a process of determining (calculating) an accumulation threshold value in the terminal device 100.

The CPU 210 executes an HD method control module 2221 included in the ACK reception program 222 to construct a control unit and a transmission unit and perform an HD method control process. The HD method control process is a process of controlling communication of an HD method by the terminal device 100.

In addition, the CPU 210 executes an accumulation threshold value calculation module 2222 included in the ACK reception program 222 to construct a control unit and perform an accumulation threshold value calculation process. The accumulation threshold value calculation process is a process of calculating an accumulation threshold value of the terminal device 100 to perform wireless communication. Meanwhile, in a case where there are a plurality of terminal devices 100 to perform wireless communication, the base station device 200 calculates an accumulation threshold value with respect to each of the plurality of terminal devices 100.

Further, the CPU 210 executes an ACK transmission relevant information notification module 2223 included in the ACK reception program 222 to construct a transmission unit and perform an ACK transmission relevant information notification process. The ACK transmission relevant information notification process is a process of including ACK transmission relevant information including the calculated accumulation threshold value in a control signal (for example, RRC signaling) and giving a notification of (transmitting) the control signal to the terminal device 100.

<ACK Transmission Process Using HD Method>

FIG. 5 depicts a diagram illustrating an example of a sequence of an ACK transmission process using an HD method. In TCP(x) (x is an integer), x denotes an identifier of a TCP packet and indicates, for example, a sequence number. Further, in ACK(y) (y is an integer), y indicates an identifier of a corresponding TCP packet (corresponding to the above-described x).

The terminal device 100 receives TCP packets (1) to (5) from the base station device 200 (S301 to S305).

The terminal device 100 transmits buffer status report (BSR) when an ACK transmission trigger is generated (S105).

FIG. 6 depicts a diagram illustrating an example of a transmission buffer at each timing. FIG. 6A depicts a diagram illustrating an example of a transmission buffer at a timing T31 of the sequence in FIG. 5. At the timing T31, ACK (1) to ACK (5) with respect to the received TCP packets (1) to (5) are accumulated in the transmission buffer.

Here, the terminal device 100 discards the number of ACKs exceeding an accumulation threshold value (for example, 4) in accordance with a discard rate by an AD method. The terminal device 100 discards, for example, ACK (1) in accordance with a discard rate in FIG. 5.

Referring back to the sequence of FIG. 5, when an ACK transmission trigger is generated, the terminal device 100 transmits a buffer status report (BSR) (S306) and receives uplink grant (UL_Grant) from the base station device 200 (S307).

BSR is a message for the terminal device 100 to request the base station device 200 to allocate wireless resources for transmitting a packet (including an ACK and a TCP packet). In addition, UL_Grant is, for example, a message including the amount of wireless resources to be allocated to the terminal device 100.

FIG. 6B depicts a diagram illustrating an example of a transmission buffer at a timing T32 of the sequence in FIG. 5. At the timing T32, ACK (2) to ACK (5) are accumulated in the transmission buffer.

The terminal device 100 sets the number of ACKs (ACK (4) and ACK(5) in FIG. 5) corresponding to the amount of allocated resources as objects to be transmitted by a PD method. Then, the terminal device 100 discards the number of ACKs (ACK(2) in FIG. 5) corresponding to a discard rate among ACKs (ACK(3) and ACK(2) in FIG. 5) other than the objects to be transmitted, and sets ACKs that are not discarded (ACK(3) in FIG. 5) as objects to be transmitted.

As described above, in an HD method, the terminal device 100 discards ACKs that are to be discard candidates, other than ACKs to be transmitted on the basis of an accumulation threshold value or the amount of allocated resources, in accordance with a discard rate. Further, in the HD method, ACKs other than ACKs as objects to be transmitted on the basis of an accumulation threshold value or the amount of allocated resources may be discarded. In this case, a ratio of the number of ACKs serving as objects to be transmitted on the basis of an accumulation threshold value or the amount of allocated resources with respect to the total number of ACKs (the ACKs as objects to be transmitted on the basis of the accumulation threshold value or the amount of allocated resources+the ACKs to be discarded) may be regarded as a discard rate.

Meanwhile, in the HD method, the terminal device 100 accumulates, for example, the number of ACKs corresponding to an accumulation threshold value in the transmission buffer and transmits ACKs accumulated at an ACK transmission timing. For example, it is possible to calculate an approximate value of a discard rate according to the following Expression (1) using an accumulation threshold value of an HD method.

$$DR = 1 - T/100 \qquad \text{Expression (1)}$$

Here, DR is a discard rate, and T is an accumulation threshold value. It is assumed that a relationship between a discard rate and an accumulation threshold value of an HD method to be described hereinafter is based on Expression (1).

<Accumulation Threshold Value Determination Process>

Figure 7:
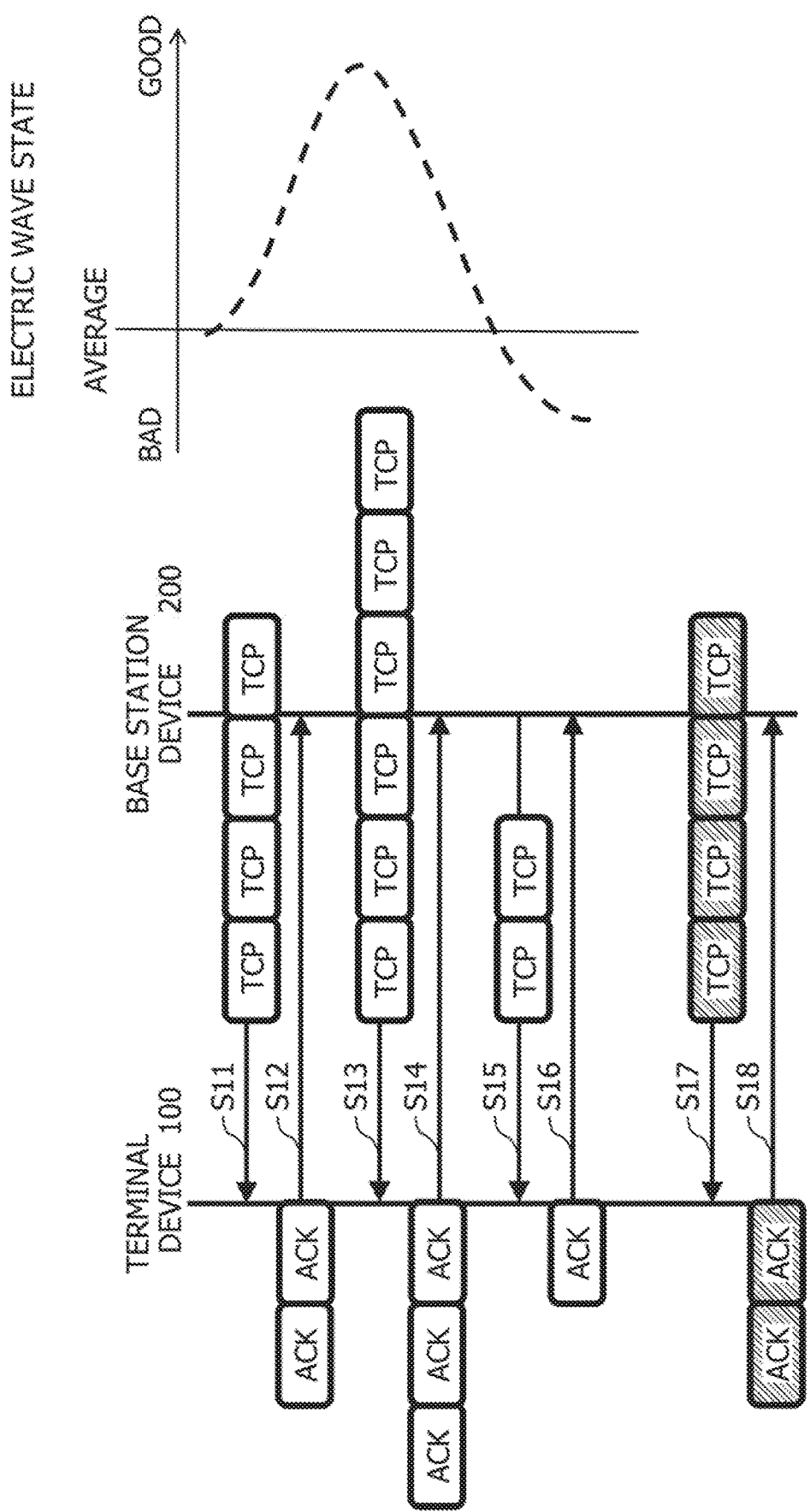
FIG. 7 depicts a diagram illustrating an example of a sequence of TCP packet reception and ACK transmission in the terminal device 100.

FIG. 7 depicts a diagram illustrating an example of a sequence of TCP packet reception and ACK transmission in the terminal device 100. Meanwhile, an example of an electric wave state in communication is illustrated in right drawing of FIG. 7. The electric wave state indicates, for example, the degree of interference in electric waves in a downlink direction and indicates that the degree of interference becomes lower as the electric wave state becomes better. Further, in FIG. 7, TCP indicates a TCP packet (including data), and ACK indicates an ACK for the reception of a TCP packet. Further, it is assumed that, for example, the terminal device 100 in FIG. 7 performs control of transmitting N/2 ACKs with respect to the reception of N (N is an integer) TCP packets.

The base station device 200 transmits four packets of TCP packets within a predetermined time when an electric wave state has an average value (for example, an average value for an execution time of processes S11 to S16) (S11). Then, the terminal device 100 transmits two packets of ACK when the terminal device receives four packets of TCP packets (S12).

In addition, when an electric wave state is good, the base station device 200 transmits six packets of TCP packets within a predetermined time (S13). Then, when the terminal device 100 receives six packets of TCP packets, the terminal device transmits three packets of ACKs (S14).

In addition, when an electric wave state is poor, the base station device 200 transmits two packets of TCP packets within a predetermined time (S15). Then, when the terminal device 100 receives the two packets of TCP packets, the terminal device transmits one packet of ACKs (S16). As described above, the base station device 200 transmits a larger number of TCP packets as an electric wave state becomes better.

In the processes S11 to S16, the terminal device 100 receives twelve packets of TCP packets in total and transmits six packets of ACKs in total. In a case where each of the process S11 and the process S12, the process S13 and the process S14, and the process S15 and the process S16 is performed in a predetermined time, an average of the number of TCP packets transmitted in a predetermined time is four packets (S17), and an average of the number of ACKs transmitted is two packets (S18).

Hereinafter, in the second embodiment, the base station device 200 determines an accumulation threshold value on the basis of an average value of the number of ACKs transmitted in a predetermined time in each of the terminal devices 100.

As illustrated in Expression (1), a discard rate may be determined on the basis of an accumulation threshold value. Consequently, the terminal device 100 calculates an accumulation threshold value and determines a discard rate on the basis of the calculated accumulation threshold value. Meanwhile, in the second embodiment, the terminal device 100 calculates an accumulation threshold value for each terminal device which is connected to the terminal device 100 in a wireless manner. Hereinafter, a method of calculating an accumulation threshold value will be described.

For example, the base station device 200 calculates an accumulation threshold value (T) using the following Expression (2) and Expression (3).

$$N_{ack}=S_{TBS}/(S_{TCP\_Segment}\times 2) \qquad \text{Expression (2)}$$

$$T=\max(N_{ack},1) \qquad \text{Expression (3)}$$

Here, $S_{TBS}$ is an average value of the amount of data of a downlink. In addition, $S_{TCP\_Segment}$ is a data size of a TCP segment. That is, $N_{ack}$ indicates an average value of the number of ACKs transmitted of the terminal device 100, for example, in a case where the terminal device 100 transmits an ACK once with respect to a TCP data (packet) received twice. Expression (2) is an expression indicating that a quotient obtained by dividing $S_{TBS}$ by $S_{TCP\_Segment}\times 2$ is $N_{ack}$.

In addition, T is set to be equal to or greater than at least 1 from Expression (3). Thereby, the terminal device 100 is prevented from not returning ACK. Further, in the second embodiment, it is assumed that $N_{ack}$ is discarded after a decimal point. Meanwhile, $N_{ack}$ may be rounded up to the nearest decimal place or may be rounded off to one decimal place. Expression (3) is an expression indicating that an integer portion of the larger one out of $N_{ack}$ and 1 is T.

As described above, the base station device 200 sets an accumulation threshold value to be an average value of the number of ACKs to be transmitted in the terminal device 100. For example, in a communication system, the return of the number of ACKs equal to or greater than the number of ACKs to be transmitted may be excessive ACK transmission in maintaining a throughput. Consequently, the base station device 200 suppresses the transmission of the number of ACKs exceeding an average by setting an average value of the number of ACKs to be transmitted to be the accumulation threshold value, on the assumption that it is sufficient to maintain more than a predetermined level of throughput as long as an average number of ACKs of the number of ACKs to be transmitted can be transmitted.

Figure 8:
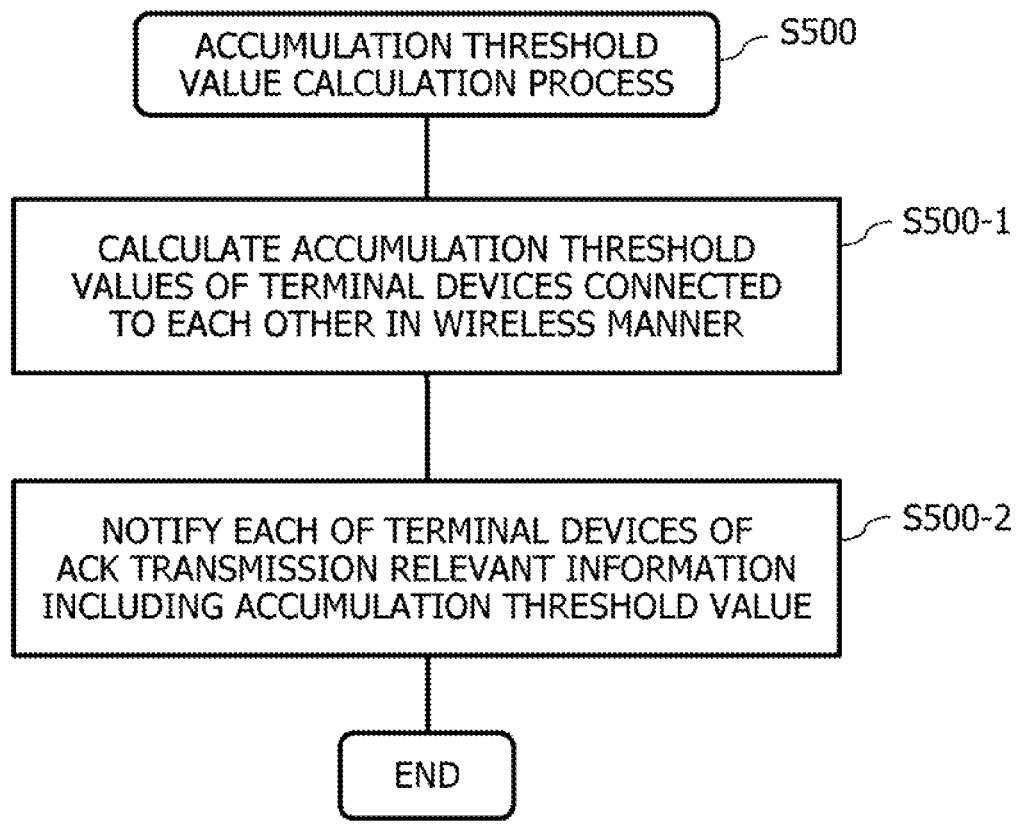
FIG. 8 depicts a diagram illustrating an example of a flowchart of an accumulation threshold value calculation process S500.

FIG. 8 depicts a diagram illustrating an example of a flowchart of an accumulation threshold value calculation process S500. The base station device 200 performs the accumulation threshold value calculation process S500 when a trigger for calculating an accumulation threshold value is generated.

The base station device 200 calculates accumulation threshold values of the terminal devices 100 connected to each other in a wireless manner (S500-1). The base station device 200 calculates an accumulation threshold value for each terminal device 100 using, for example, the above-described Expression (2) and Expression (3).

Then, the base station device 200 notifies each of the terminal devices 100 of ACK transmission relevant information including the accumulation threshold value (S500-2) and terminates the process. The base station device 200 notifies the terminal device 100 of the ACK transmission relevant information using a control signal (for example, RRC signaling).

<Simulation 1>

Hereinafter, simulation results in a case where an accumulation threshold value is calculated using the above-described Expression (2) and Expression (3) will be described.

FIG. 9 depicts a diagram illustrating an example of an accumulation threshold value of each of the terminal devices 100. FIG. 9 illustrates $N_{ack}$ calculation values and accumulation threshold values (T) of ten terminal device 100 (UE1 to UE10 in FIG. 9). For example, an accumulation threshold value in UE8 is 2.

Figure 10A:
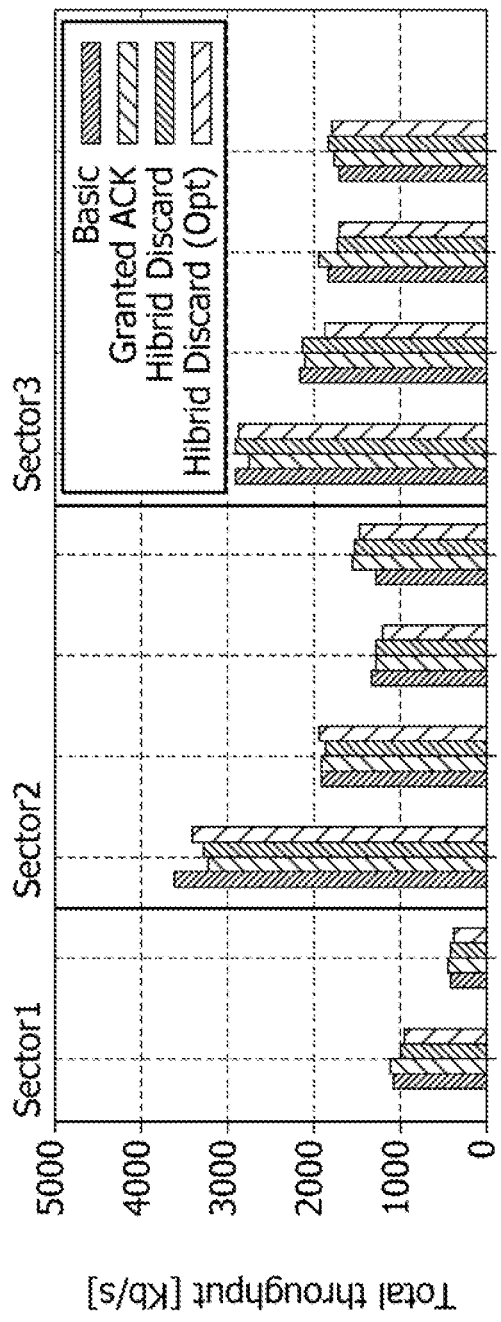
FIG. 10A and FIG. 10B depict diagram illustrating an example of the number of ACKs to be transmitted and a throughput of each of UE1 to UE10.
Figure 10B:
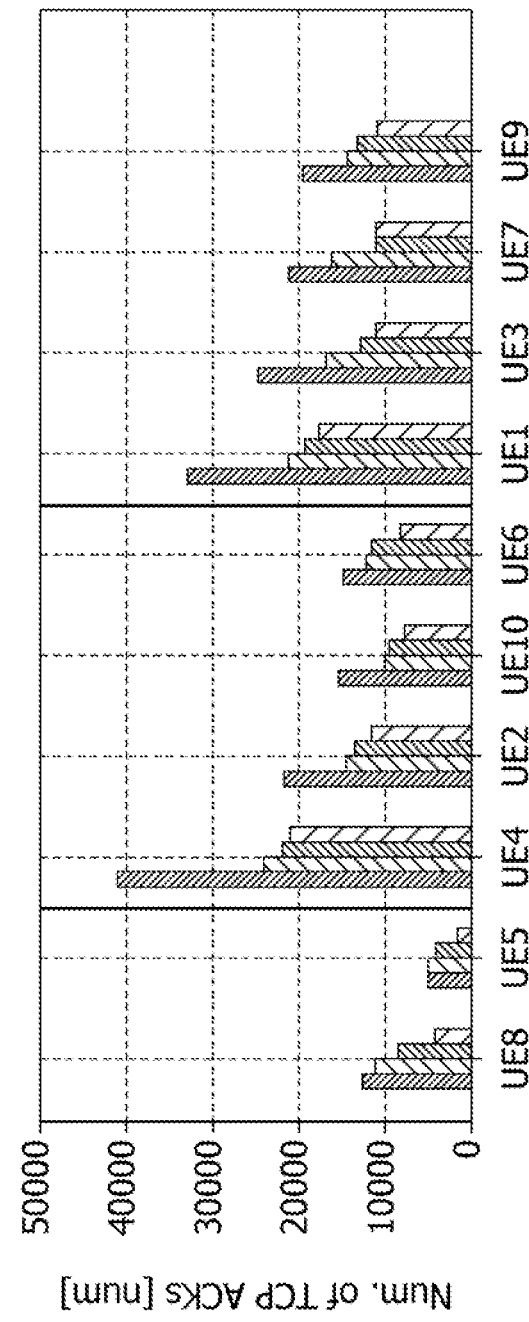

FIG. 10 depicts a diagram illustrating an example of the number of ACKs to be transmitted and a throughput of each of UE1 to UE10. FIG. 10A depicts a diagram illustrating an example of an average value of throughputs. FIG. 10B depicts a diagram illustrating an example of the number of ACKs to be transmitted. Meanwhile, for comparison with other methods, FIG. 10 illustrates simulation results for each UE in a Basic method, a Granted ACK method, a Hybrid Discard method, and a Hybrid Discard (Opt) method from the left.

The Basic method (which may hereinafter be referred to as a first method) is a method in which ACKs are returned with respect to all TCP packets, and ACKs are not discarded. The Granted ACK method (which may hereinafter be referred to as a second method) is a method in which ACK is returned in accordance with wireless resources allocated to a downlink, and excessive ACKs are discarded. The Hybrid Discard method (which may hereinafter be referred to as a third method) is a method in which ACKs corresponding to an accumulation threshold value are returned, and excessive ACKs are returned in accordance with downlink allocation wireless resources. A discard rate is fixed to 0.96, independently of a terminal device. The Hybrid Discard (Opt) method (which may hereinafter be referred to as a proposal method) is a method in the second embodiment, and the values illustrated in FIG. 9 are used as the accumulation threshold value of UE1 to UE10.

For example, as illustrated in FIG. 10A, UE4 has a more improved throughput in a proposal method than in the second and third methods. In addition, as illustrated in FIG. 10A, UE4 has the same throughput in the proposal method as in the first method. In addition, as illustrated in FIG. 10B, UE4 has a more suppressed number of ACKs to be transmitted in the proposal method than in the first to third methods.

In addition, regarding the other UEs, it can be understood that the same or better throughput is maintained in a proposal method as compared to the comparison target methods with fewer or the same number of ACKs to be transmitted as compared to the first to third methods.

<Simulation 2>

Simulation is performed by increasing the number of terminal devices 100 as compared to the simulation 1.

Figure 11:
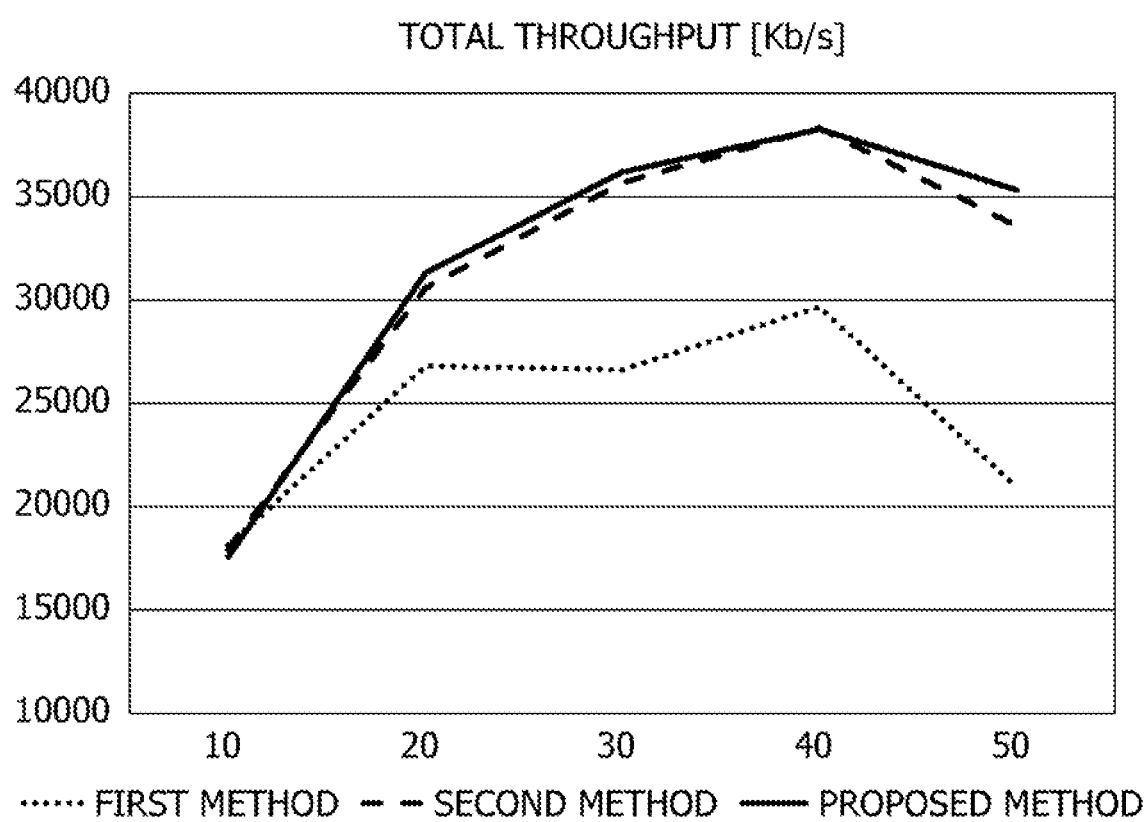
FIG. 11 depicts a diagram illustrating an example of a total throughput for each number of terminal devices 100.

FIG. 11 depicts a diagram illustrating an example of a total throughput for each number of terminal devices 100. The total throughput is, for example, a total value of average throughputs of the respective terminal devices 100. As illustrated in FIG. 11, a proposal method has a better total throughput than those of first and second methods. For example, the proposal method has the best total throughput when the number of terminal devices 100 is 40.

Figure 12:
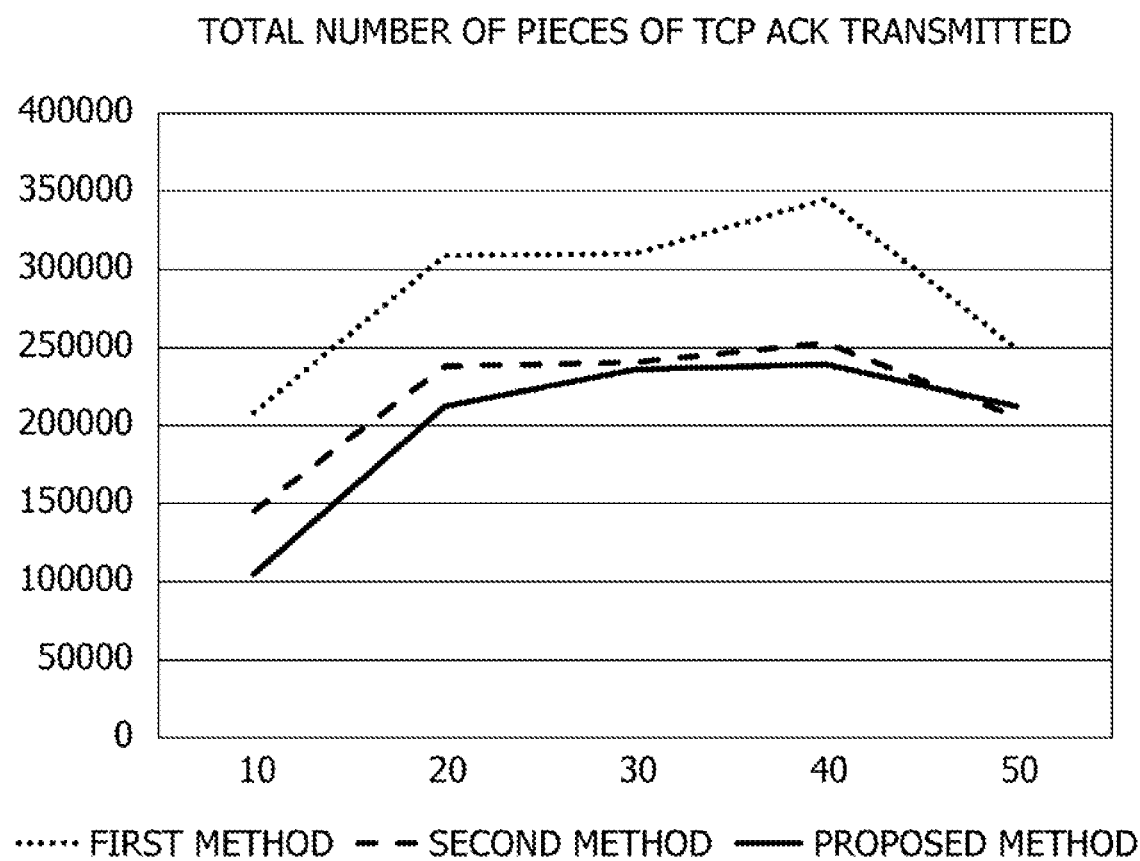
FIG. 12 depicts a diagram illustrating an example of the number of ACKs to be transmitted for each number of terminal devices 100.

FIG. 12 depicts a diagram illustrating an example of the number of ACKs to be transmitted for each number of terminal devices 100. For example, when the number of terminal devices 100 is 40 in which a total throughput is best, the number of ACKs to be transmitted in a proposal method is smaller than those in first and second methods. Hereinafter, description will be given of simulation results for a throughput and the number of ACKs to be transmitted of each of the terminal devices 100 in a case where the number of terminal devices 100 is 40.

Figure 13:
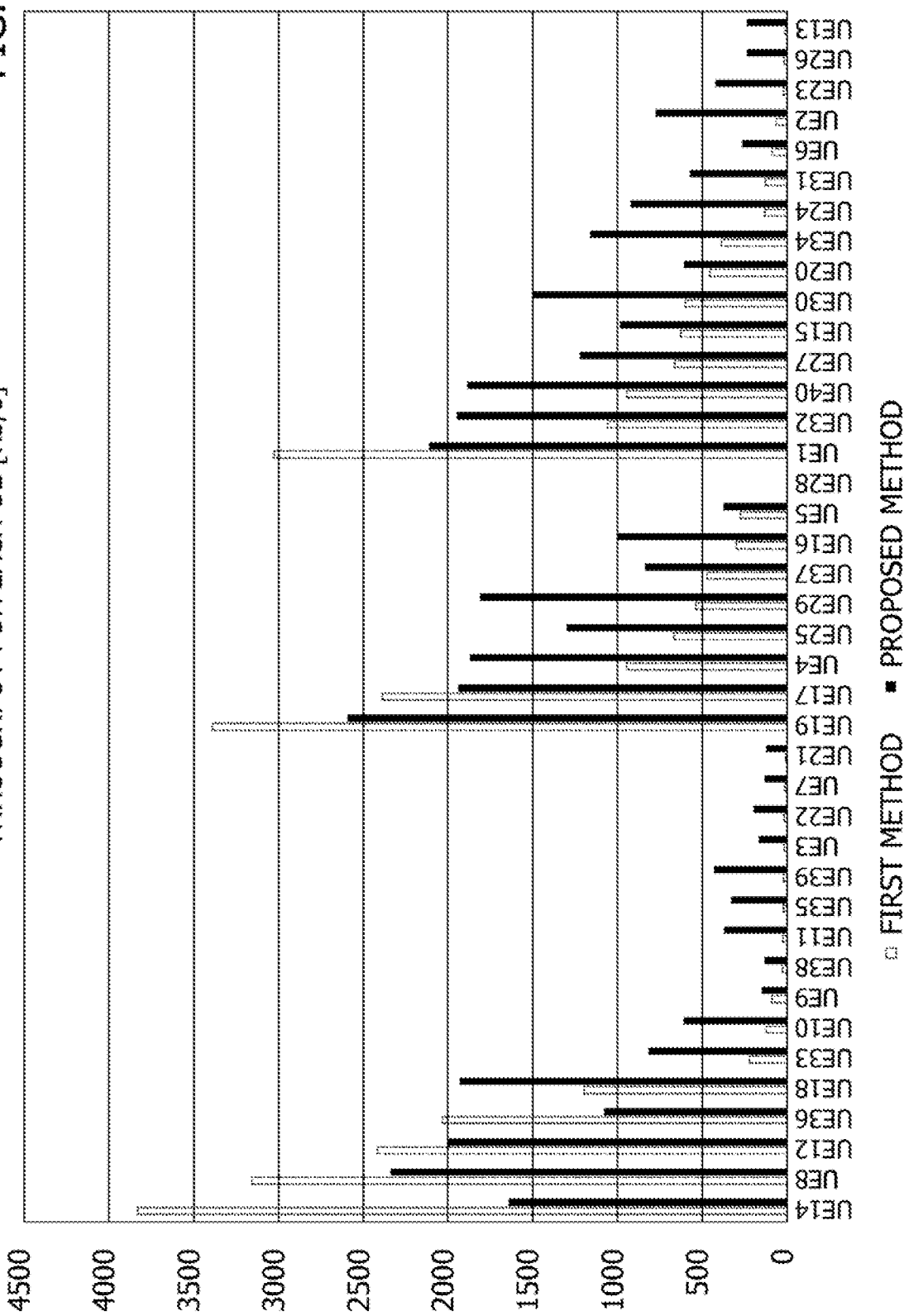
FIG. 13 depicts a diagram illustrating an example of throughputs in a first method and a proposal method for each terminal device 100.

FIG. 13 depicts a diagram illustrating an example of throughputs in a first method and a proposal method for each terminal device 100. In addition, FIG. 14 depicts a diagram illustrating an example of throughputs in a second method and a proposal method for each terminal device 100.

For example, as illustrated in FIG. 13, in the first method, UE14, UE8, UE19, and UE1 have a prominently good throughput. On the other hand, in the first method, UE38, UE11, UE35, UE39, UE3, UE22, UE7, UE21, UE23, UE26, and UE13 have a poor throughput which is approximate to 0.

On the other hand, in the proposal method, UE14, UE8, UE19, and UE1 have a good throughput as compared to the other UEs, but the throughputs are not as prominent as in the first method. Further, in the proposal method, throughputs of UE38, UE11, UE35, UE39, UE3, UE22, UE7, UE21, UE23, UE26, and UE13 are not as small as in the first method. As illustrated in FIG. 11, when the number of terminal devices 100 is 40, a total throughput in the first method is larger than that in the proposal method. That is, it can be understood that the proposal method is an fair method having a small difference in throughput between terminal devices as compared to the first method.

Figure 14:
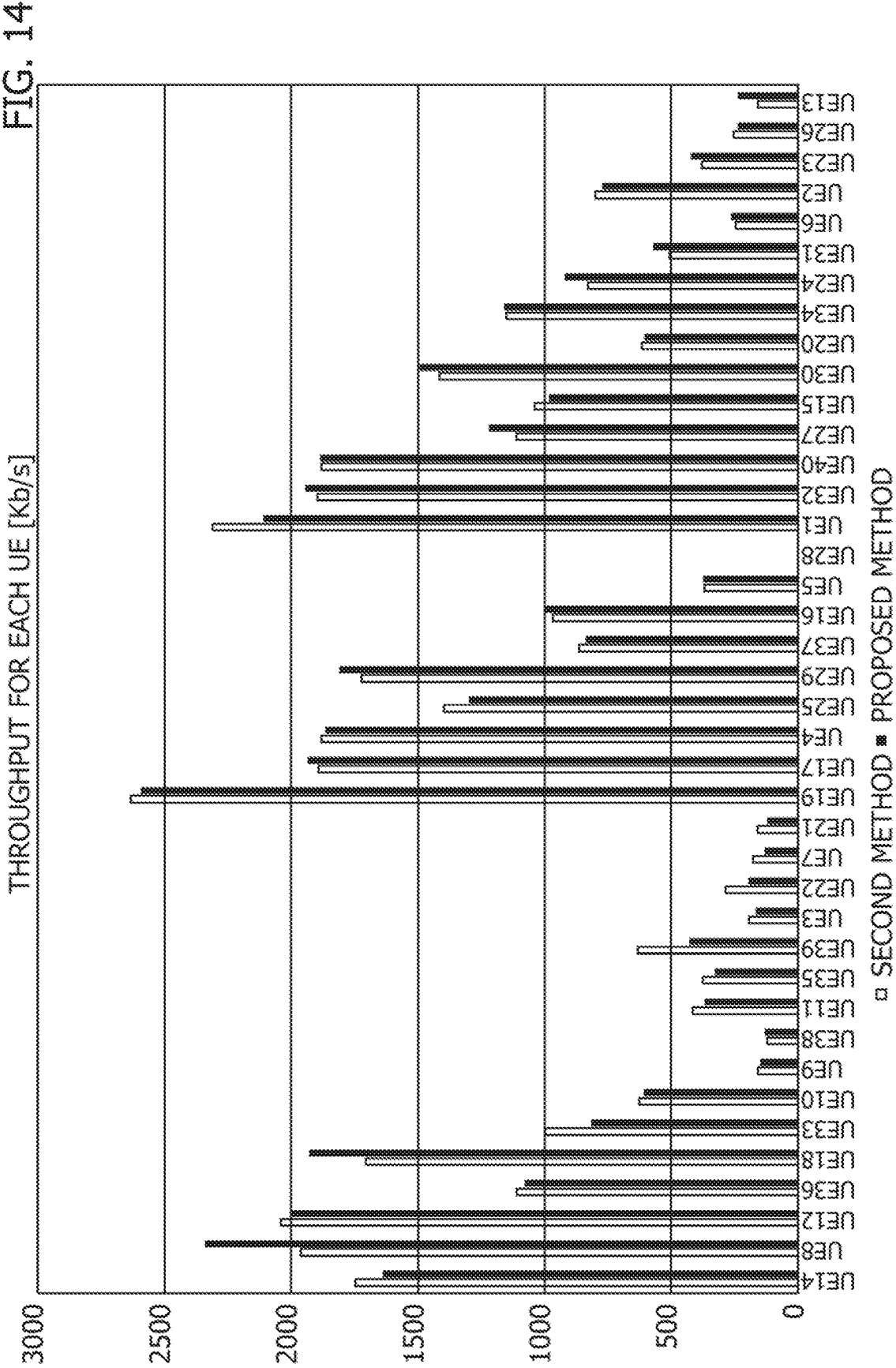
FIG. 14 depicts a diagram illustrating an example of throughputs in a second method and a proposal method for each terminal device 100.

In addition, as illustrated in FIG. 14, it can be understood that a proposal method is an fair method having an equal or small difference in throughput between terminal devices as compared to the second method.

Figure 15:
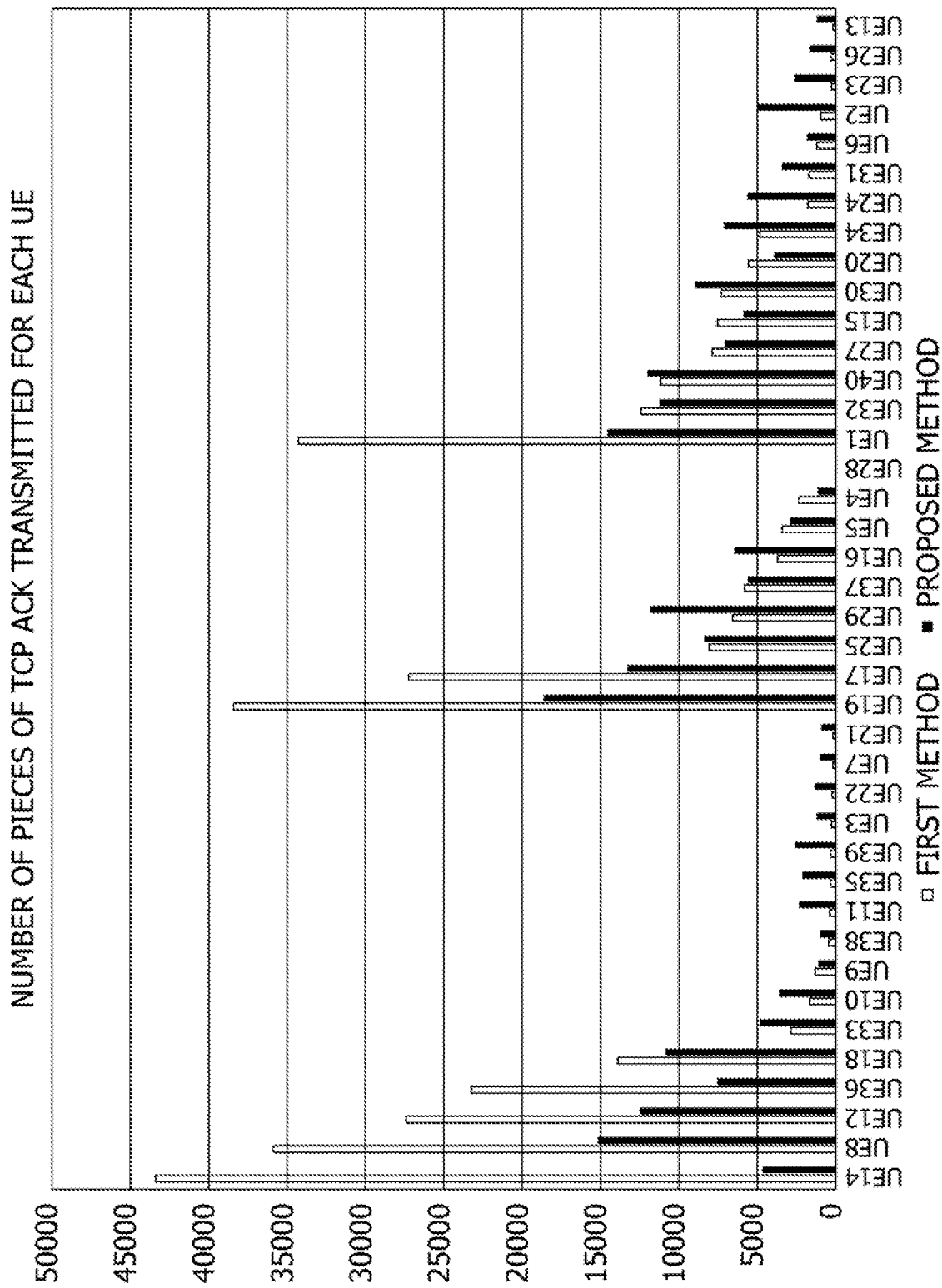
FIG. 15 depicts a diagram illustrating an example of the number of ACKs to be transmitted in each of a first method and a proposal method for each terminal device 100.

FIG. 15 depicts a diagram illustrating an example of the number of ACKs to be transmitted in each of a first method and a proposal method for each terminal device 100. In addition, FIG. 16 depicts a diagram illustrating an example of the number of ACKs to be transmitted in each of a second method and a proposal method for each terminal device 100.

For example, as illustrated in FIG. 15, in the first method, UE14, UE8, UE19, and UE1 have a prominently large number of ACKs to be transmitted. On the other hand, in the first method, UE38, UE11, UE35, UE39, UE3, UE22, UE7, UE21, UE23, UE26, and UE13 have a small number of ACKs to be transmitted which is approximate to 0.

On the other hand, in the proposal method, UE14, UE8, UE19, and UE1 have a large number of ACKs to be transmitted as compared to the other UEs, but the numbers of ACKs to be transmitted are not as prominent as in the first method. Further, in the proposal method, the numbers of ACKs to be transmitted of UE38, UE11, UE35, UE39, UE3, UE22, UE7, UE21, UE23, UE26, and UE13 are not as small as in the first method. As illustrated in FIG. 12, when the number of terminal devices 100 is 40, the number of ACKs to be transmitted in the first method is smaller than in the proposal method. That is, it can be understood that the proposal method is an fair method also in terms of ACK transmission and has a small difference in the number of ACKs to be transmitted between terminal devices in addition to a small total number of ACKs to be transmitted as compared to the first method.

In addition, as illustrated in FIG. 16, it can be understood that the proposal method is an fair method also in terms of ACK transmission and has an equal or small difference in the number of ACKs to be transmitted between terminal devices in addition to a small total number of ACKs to be transmitted as compared to the second method.

In the second embodiment, the terminal device 100 discards ACK in two steps. In a first step, ACKs are discarded using an accumulation threshold value determined on the basis of an average transmission rate. By the first step, it is possible to suppress excessive allocation of wireless resources to the terminal device 100.

In a second step, ACKs corresponding to the amount of wireless resources allocated are transmitted, and the remaining ACKs are discarded. By the second step, it is possible to suppress the transmission of excessive ACK by transmitting ACKs corresponding to the amount of wireless resources allocated.

OTHER EMBODIMENTS

The processes in the respective embodiments may be combined with each other. For example, Expressions (1) to (3) in the second embodiment may be used to calculate an accumulation number (accumulation threshold value) in the first embodiment.

According to the disclosure, a delay in the transmission and reception of data is suppressed even when a method of discarding some ACKs is applied.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

10 Communication system
100 Terminal device
110 CPU
120 Storage
121 Communication program
122 ACK transmission program
130 Memory
150 RF circuit
200 Base station device
201 Control unit
202 Transmission unit
203 Data
210 CPU
220 Storage
221 Communication control program
222 ACK reception program
230 Memory
250 RF circuit
300 Network

What is claimed is:

1. A base station device that communicates with a terminal device in a wireless manner, the base station device comprising:
   a receiver configured to receive data from the terminal device;
   a controller configured to determine an accumulation number which is a number of reception confirmation packets that are able to be accumulated in the terminal device, in accordance with an amount of data received from the terminal device, the reception confirmation packets are responses to packets that are transmitted from the base station device to the terminal device, the reception confirmation packets being transmitted from the terminal device to the base station device; and
   a transmitter configured to transmit a control signal including the determined accumulation number to the terminal device, wherein the data is different from the reception confirmation packets, and the controller is further configured to control to cause the terminal device to discard prior to transmission, a reception confirmation packet which is included in the reception confirmation packets and exceeds the accumulation number by the transmitting of the control signal via the transmitter.

2. The base station device according to claim 1, wherein the controller configured to determine the accumulation number for each of a plurality of the terminal devices in a case where the number of terminal devices is plural, and the transmitter is configured to transmit the control signal for each of the plurality of terminal devices.

3. The base station device according to claim 1, further comprising an allocator configured to allocate wireless resources to the terminal device, wherein the terminal device transmits the number of reception confirmation packets corresponding to the amount of wireless resources allocated to the base station device, among the reception confirmation packets corresponding to the accumulation number, to the base station device.

4. The base station device according to claim 1, wherein the controller is further configured to control to cause the terminal device to discard a second reception confirmation packet which is included in the reception confirmation packets when a first reception confirmation packet included in the reception confirmation packets is transmitted by the terminal device.

5. A terminal device that communicates with a base station device configured to receive data from the terminal device in a wireless manner, the terminal device comprising:

a transmitter configured to transmit the data to the base station device;

a receiver configured to receive a control signal including an accumulation number which is a number of reception confirmation packets that are able to be accumulated, the accumulation number being determined by the base station device in accordance with an amount of data transmitted by the terminal device, the reception confirmation packets are responses to packets that are transmitted from the base station device to the terminal device, the reception confirmation packets being transmitted from the terminal device to the base station device; and a transmission controller configured to:

accumulate the reception confirmation packets corresponding to the accumulation number included in the received control signal, and discard prior to transmission, the reception confirmation packets which are included in the confirmation packets and exceed the accumulation number, wherein the data is different from the reception confirmation packets.

6. A communication method in a base station device that communicates with a terminal device in a wireless manner, the communication method comprising:

receiving data from the terminal device;

determining an accumulation number which is a number of reception confirmation packets that are able to be accumulated in the terminal device, in accordance with an amount of data received from the terminal device, the reception confirmation packets are responses to packets that are transmitted from the base station device to the terminal device, the reception confirmation packets being transmitted from the terminal device to the base station device; and transmitting a control signal including the determined accumulation number to the terminal device, wherein the data is different from the reception confirmation packets; and the communication method further comprising controlling to cause the terminal device to discard prior to transmission, a reception confirmation packet which is included in the reception confirmation packets and is exceed the accumulation number by the transmitting of the control signal.

* * * * *